(12) United States Patent
Ait-Ameur et al.

(10) Patent No.: US 8,601,142 B2
(45) Date of Patent: Dec. 3, 2013

(54) ADAPTIVE NETWORK ADDRESS TRANSLATION BINDING FOR WIRELESS NETWORKS

(75) Inventors: Samir Ait-Ameur, Fremont, CA (US); Imtiaz Shaikh, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 227 days.

(21) Appl. No.: 12/987,305

(22) Filed: Jan. 10, 2011

(65) Prior Publication Data

US 2012/0179830 A1    Jul. 12, 2012

(51) Int. Cl.
  *G06F 15/16* (2006.01)
(52) U.S. Cl.
  USPC .......................................... 709/228; 709/229
(58) Field of Classification Search
  USPC ....................................................... 709/228
  See application file for complete search history.

(56) References Cited

U.S. PATENT DOCUMENTS

| 6,553,000 | B1 * | 4/2003 | Ganesh et al. | 370/235 |
| 2003/0115303 | A1 * | 6/2003 | Marian et al. | 709/222 |
| 2011/0047256 | A1 * | 2/2011 | Babu et al. | 709/223 |

OTHER PUBLICATIONS

Zhang, J. ,Investigation of Pushback Based Detection and Prevention of Network Bandwidth Attacks, Information Assurance Workshop, 2004. IEEE SMC , Jun. 10-11, 2004, pp. 416-423.*
Pejhan, S.; Eleftheriadis, A.; Anastassiou, D., Distributed Multicast Address Management in the Global Internet, IEEE Journal, 1995 , pp. 1445-1456.*
A. J. MAcauley, Self-Configuring Networks, 2000, IEEE, pp. 315-319.*
Borella et al., Realm Specific IP: Framework, Oct. 2011, RFC 3102, pp. 1-32.*
Tsirtsis G. and Srisuresh P., Network Address Translation—Protocol Translation, Feb. 2000, Campio Communications, pp. 1-22.*

* cited by examiner

*Primary Examiner* — Oscar Louie
*Assistant Examiner* — Olanrewaju Bucknor

(57) ABSTRACT

The binding of addresses and port ranges is performed by a device, based on network usage conditions. The device may determine a port block size, indicating a quantity of ports, to allocate to client devices. The device may transmit a message including an Internet Protocol (IP) address and a port range. The message may indicate that the IP address and port range is to be allocated to the one of the client devices based on an order of a first port value and a second port value in the port range, where the port range covers a quantity of ports corresponding to the port block size.

19 Claims, 12 Drawing Sheets

| INDEX (B) | START PORT VALUE | END PORT VALUE | STATUS |
|---|---|---|---|
| 0 | 1000 | 1099 | ALLOCATED |
| 1 | 1100 | 1199 | NOT ALLOCATED |
| 2 | 1200 | 1299 | NOT ALLOCATED |
| 3 | 1300 | 1399 | NOT ALLOCATED |
| 4 | 1400 | 1499 | NOT ALLOCATED |
| ⋮ | ⋮ | ⋮ | ⋮ |

| INDEX (B) | START PORT VALUE | END PORT VALUE | STATUS |
|---|---|---|---|
| 0 | 1000 | 1099 | ALLOCATED |
| 1 | 1100 | 1199 | NOT ALLOCATED |
| 2 | 1200 | 1299 | NOT ALLOCATED |
| 3 | 1300 | 1399 | NOT ALLOCATED |
| 4 | 1400 | 1499 | NOT ALLOCATED |
| ... | ... | ... | ... |

Fig. 7

| INDEX (B) | START PORT VALUE | END PORT VALUE |
|---|---|---|
| 0 | 1000 | 1099 |
| 1 | 1199 | 1100 |
| 2 | 1299 | 1200 |
| 3 | 1399 | 1300 |
| 4 | 1499 | 1400 |
| ... | ... | ... |

```
NAT-IP-Address = 174.238.4.19  ~1010
NAT-Port-Block-Range Sequence = 1:20  ~1020
Loading-Factor = 1
Binding-Timer = 300
Correlation-Id = fSqd9Yw6
Event-Timestamp = 1259699948
Framed-IP-Address = 10.8.9.43
```
1000

Fig. 10A

```
NAT-IP-Address = 174.238.4.19  ~1040
NAT-Port-Block-Range Sequence = 20:1  ~1050
Loading-Factor = 1
Binding-Timer = 300
Correlation-Id = fSqd9Yw6
Event-Timestamp = 1259699948
Framed-IP-Address = 10.8.9.43
```
1030

ADAPTIVE NETWORK ADDRESS TRANSLATION BINDING FOR WIRELESS NETWORKS

BACKGROUND

In an increasingly networked world, more and more traffic, such as data, voice, and video, is transmitted over public and proprietary networks. Wireless networks, in particular, are becoming increasingly popular as networks through which subscribers obtain both voice services (e.g., telephone calls) and data services (e.g., email and web surfing). For data services, the wireless device may be connected, through the wireless network, to a data network, such as the Internet.

Network address translation (NAT) is the process of modifying network address information in datagram (e.g., packet) headers while in transit across a traffic routing device for the purpose of remapping one address space into another. One use of NAT is that it allows for a single Internet protocol (IP) address to be shared among a number of devices, such as portable wireless devices, thus increasing the effective number of addresses from which a service provider can choose when allocating addresses to the portable wireless devices.

In one type of NAT address sharing, in addition to allocating IP addresses, NAT may also be used to allocate a port range. Thus, a particular connecting wireless device may be assigned an IP address and a range of ports that are useable by the device. By allocating port ranges in addition to IP addresses, the effective address space that the service provider uses when assigning addresses to the portable wireless devices, may be increased significantly.

BRIEF DESCRIPTION OF THE DRAWINGS

FIGS. 7 and 8 are diagrams illustrating example sequences of starting port numbers and ending port numbers;

FIGS. 10A and 10B are diagrams illustrating example header fields for allocating an IP address and a port block;

DETAILED DESCRIPTION

The following detailed description refers to the accompanying drawings. The same reference numbers in different drawings may identify the same or similar elements. Implementations described herein may include techniques for binding addresses and port ranges, as part of a NAT operation, to portable devices or to downstream network devices (e.g., gateways) in a telecommunication network. The telecommunication network may be, for example, a long term evolution (LTE) based network or a 3rd Generation Partnership Project (3GPP or 3G) based network. The assignment of the addresses/port ranges to the portable devices may be performed using an adaptive port allocation and de-allocation technique in which the number of ports to assign per portable device may be based on network usage statistics, such as the number of subscribers that are connected during a peak period. Additionally, NAT address/port decisions may be communicated to the portable devices in an IP header in which the sequence of the beginning and ending port range values may be used to indicate whether the indicated ports should be allocated or de-allocated.

Figure 1:
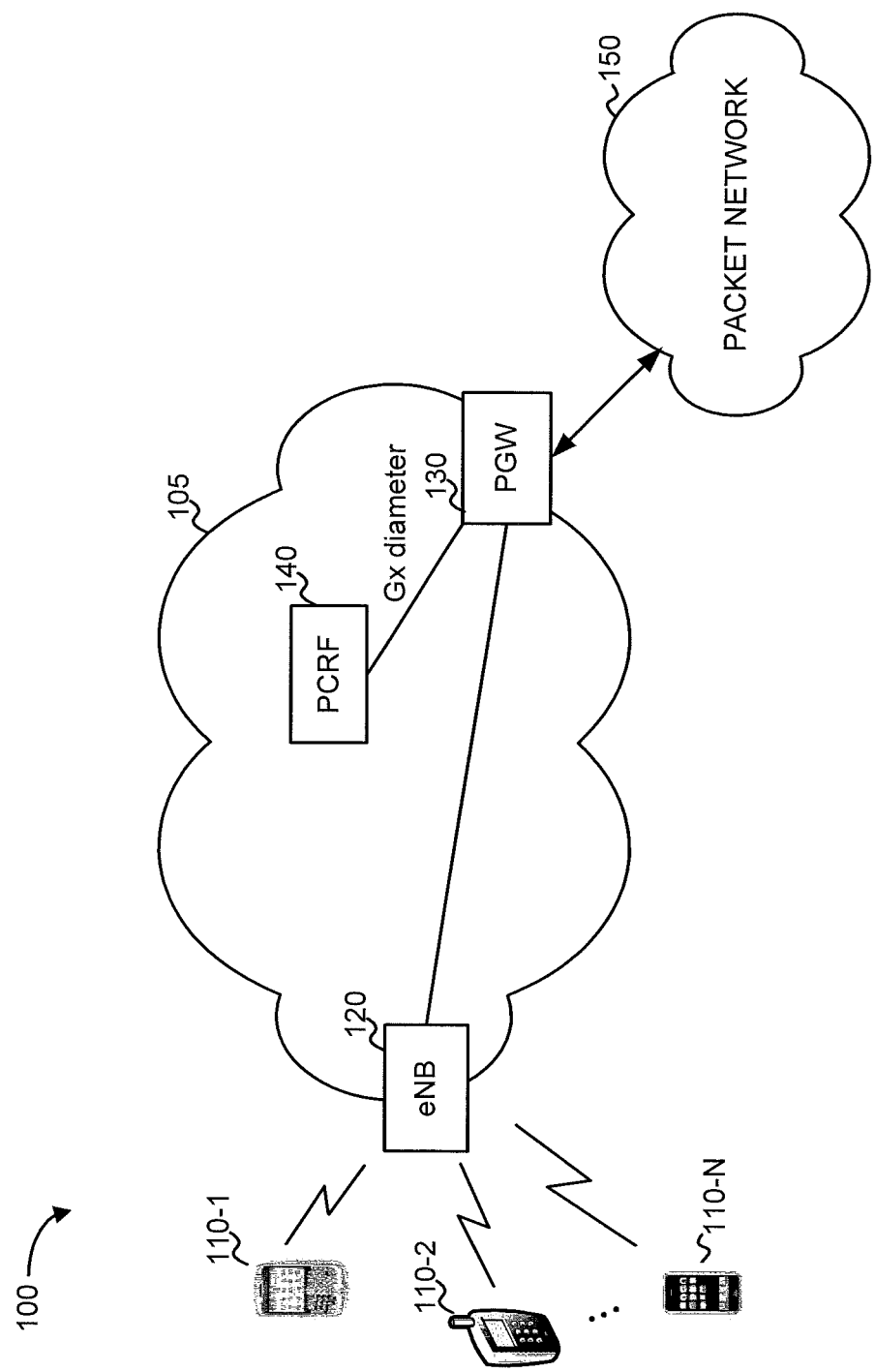
FIG. 1 is a diagram illustrating an example system.

FIG. 1 is a diagram illustrating an example system 100. System 100 may generally illustrate a wireless communication system based on the Long Term Evolution (LTE) mobile communication standard. In alternative implementations, other communication standards could be used.

As shown in FIG. 1, system 100 may include one or more client devices 110-1 through 110-N (referred to collectively as client devices 110, and in some cases individually as client device 110), such as mobile phones or other portable communication devices, that connect to a wireless core network 105. A second network, a packet network 150, may connect to core network 105. Core network 105 may represent elements in a wireless core network designed to provide wireless telecommunication access to client devices 110. Packet network 150 may include, for example, the Internet.

Client devices 110 may generally include devices designed to communicate with core network 105. Client devices 110 may include, for example, mobile telephones, smart phones, electronic notepads, laptops, personal computers, home routers, WiFi hotspots, and/or personal digital assistants (PDAs). Client devices 110 may establish wireless communication sessions with core network 105. The wireless communication sessions may be used for voice (e.g., telephone calls) or data sessions.

As previously mentioned, core network 105 may include components of a wireless network. In one exemplary implementation, and as illustrated, core network 105 may include components that implement a LTE network. Other network technologies, such as International Mobile Telecommunications-2000 ("3G"), or second-generation wireless telephone technology ("2G"), may alternatively or additionally be implemented.

As particularly shown in FIG. 1, the components of core network 105 may include a radio access node (eNB) 120 (also called base station 120 herein), a packet data network gateway (PGW) 130, and a policy charging and rules function (PCRF) server 140.

In general, a number of other networks devices, which are not shown herein for clarity, may also be used in the implementation of wireless core network 105. For example, core network 105 may additionally include a Mobile Switching Center (MSC), a Gateway MSC (GMSC), a Media Gateway (MGW), a Serving General Packet Radio Service (GPRS) Support Node (SGSN), a Gateway GPRS Support Node (GGSN), and/or other network devices.

Base station 120 may provide a radio interface for client devices 110. Base station 110 may include, from a network access perspective, a physical (PHY) layer, a medium access control (MAC) layer, a radio link control (RLC) layer, and a packet data control protocol (PDCP) layer. Base station 120 may also offer radio resource control (RRC) functionality corresponding to the control plane. Base station 120 may perform many functions including radio resource management, admission control, scheduling, cell broadcast, ciphering/deciphering of user and control plane data, and compression/decompression of user plane packet headers.

PGW 130 may provide connectivity to external networks, such as packet network 150. A client device 110 may have simultaneous connectivity with more than one PGW to multiple additional networks. PGW 130 may perform, for example, policy enforcement, packet filtering for each user, charging support, lawful interception, and/or packet screening. Additionally, as will be described in more detail below, PGW 130 may perform NAT functions. The NAT functions may be performed in response to requests from client devices 110 to access packet network 150. PGW 130 may, for instance, assign each requesting client device 110 an IP address and port range (also called a "port block" herein) that the client device may use in subsequent communications with packet network 150.

PCRF 140 may be a server that may access subscriber databases and other resources to make policy decisions relating to client devices 110. The policy decisions may relate to, for example, quality of service (QoS) decisions for client devices 110 and charging rules for client devices 110. PGW 130 may connect with PCRF 140 using a diameter protocol and a Gx interface. In some implementations, PCRF 140 may assist in the NAT functions performed by PGW 130 by, for example, providing PGW 130 with valid network addresses, port blocks, and/or network usage information.

Packet network 150 may include, for example, a public packet-based network, such as the Internet.

Although FIG. 1 illustrates exemplary components of system 100, in other implementations, system 100 may include additional, fewer, different, or differently arranged components than those illustrated in FIG. 1 and described herein. For example, core network 105 may include many base stations 120.

Figure 2:
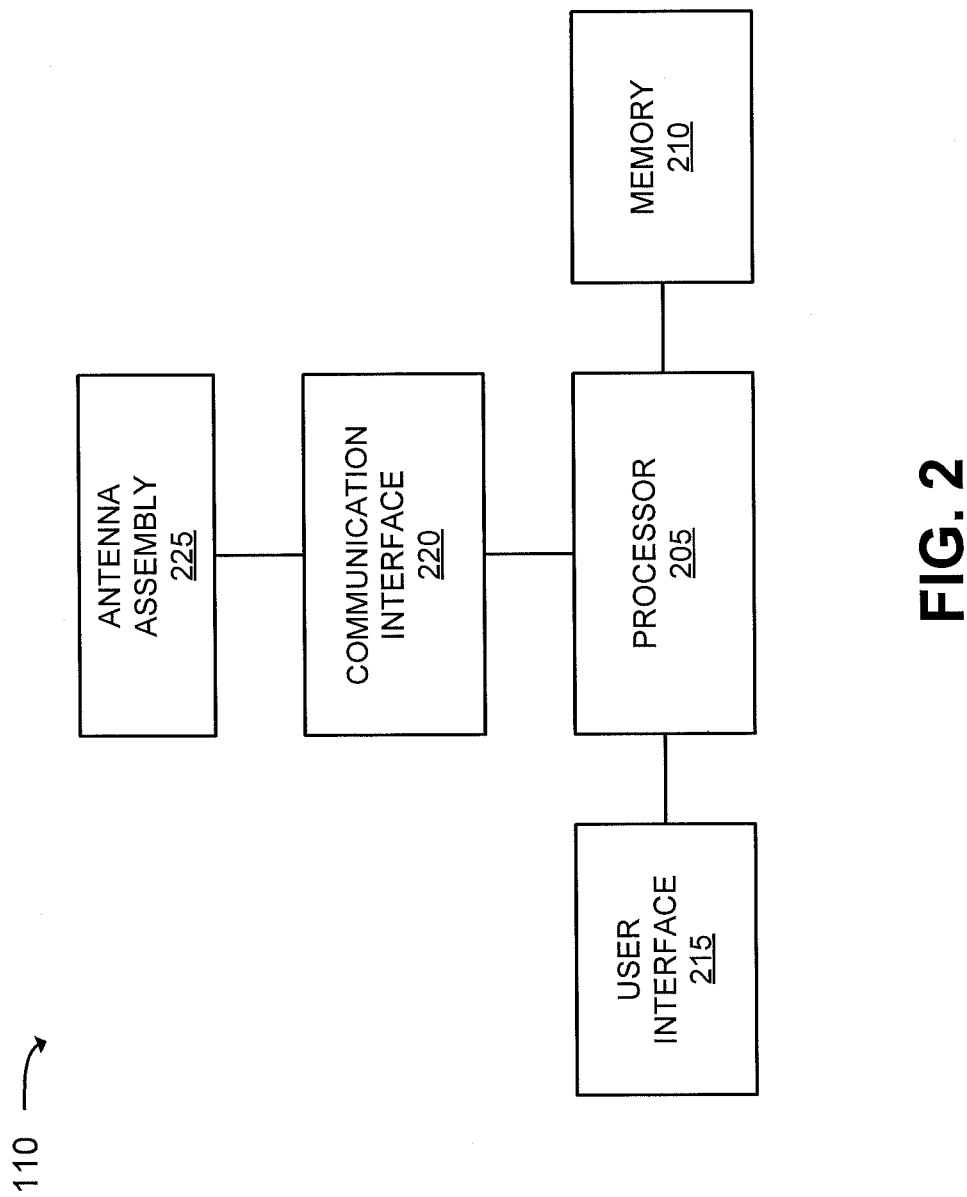
FIG. 2 is an example of components of a client device depicted in FIG. 1.

FIG. 2 is an example of components of a client device 110 according to a one implementation. As shown in FIG. 2, client device 110 may include a processor 205, a memory 210, a user interface 215, a communication interface 220, and/or an antenna assembly 225. Processor 205 may include one or more processors, microprocessors, application specific integrated circuits (ASICs), field programmable gate arrays (FPGAs), etc. Processor 205 may control operation of client device 110 and its components. Memory 210 may include a random access memory (RAM), a read-only memory (ROM), and/or another type of memory to store data and instructions that may be used by processor 205.

User interface 215 may include mechanisms for inputting information to client device 110 and/or for outputting information from client device 110. Examples of input and output mechanisms might include buttons (e.g., control buttons, keys of a keypad, a joystick, etc.) to permit data and control commands to be input into client device 110; a speaker to receive electrical signals and output audio signals; a microphone to receive audio signals and output electrical signals; a display to receive input (e.g., when the display is implemented as a touch screen) and/or output visual information (e.g., text input into client device 110); and/or a vibrator to cause client device 110 to vibrate.

Communication interface 220 may include, for example, a transmitter that may convert baseband signals from processor 205 to radio frequency (RF) signals and/or a receiver that may convert RF signals to baseband signals. Alternatively, communication interface 220 may include a transceiver to perform functions of both a transmitter and a receiver. Communication interface 220 may connect to antenna assembly 225 for transmission and/or reception of the RF signals. Antenna assembly 225 may include one or more antennas to transmit and/or receive RF signals over the air. Antenna assembly 225 may, for example, receive RF signals from communication interface 220 and transmit the RF signals over the air, and receive RF signals over the air and provide them to communication interface 220. In one implementation, for example, communication interface 220 may communicate with a network, such as network 100.

As will be described in detail below, client device 110 may perform certain operations in response to processor 205 executing software instructions of an application contained in a computer-readable medium, such as memory 210. A computer-readable medium may be defined as a non-transitory memory device. A memory device may include a space within a single physical memory device or spread across multiple physical memory devices.

The software instructions may be read into memory 210 from another computer-readable medium or from another device via communication interface 220. The software instructions contained in memory 210 may cause processor 205 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows example components of client device 110, in other implementations, client device 110 may include fewer components, different components, differently arranged components, or additional components than depicted in FIG. 2. Additionally, or alternatively, one or more components of client device 110 may perform one or more of the tasks described as being performed by one or more other components of client device 110.

Figure 3:
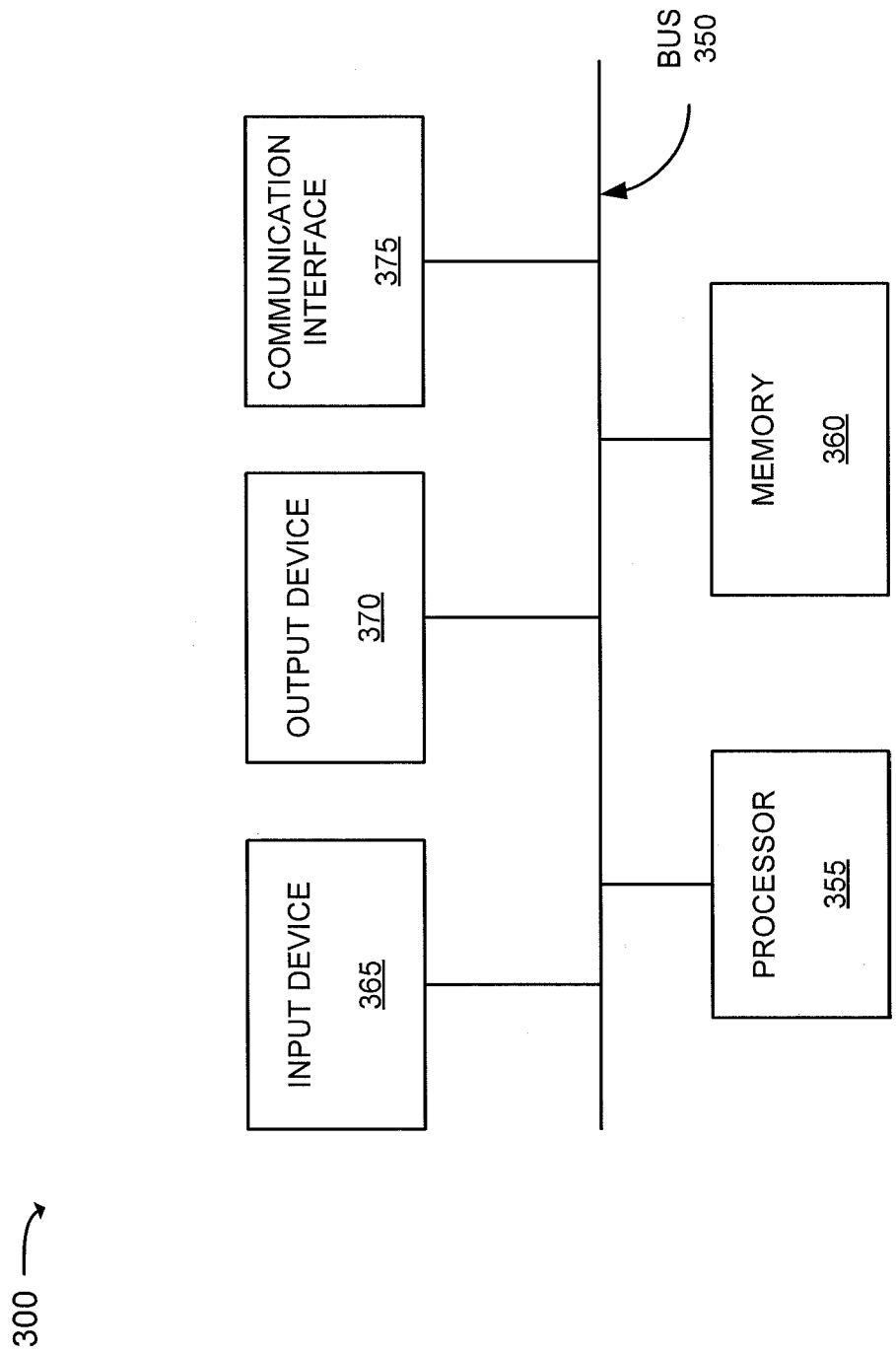
FIG. 3 is an example of components of a network device depicted in FIG. 1.

FIG. 3 is an example of components of a network device 300, such as PGW 130 or PCRF 140. As illustrated, network device 300 may include a bus 350, a processor 355, a memory 360, an input device 365, an output device 370, and a communication interface 375.

Bus 350 may permit communication among the components of network device 300. Processor 355 may include one or more processors and/or microprocessors that interpret and execute instructions. Additionally or alternatively, processor 355 may be implemented as or include one or more ASICs, FPGAs, or the like. Memory 360 may include a RAM or another type of dynamic storage device that stores information and instructions for execution by processor 355, a ROM or another type of static storage device that stores static information and instructions for the processor 355, and/or some other type of magnetic or optical recording medium and its corresponding drive for storing information and/or instructions.

Input device 365 may include a device that permits an operator to input information to network device 300, such as a keyboard, a keypad, a mouse, a pen, a microphone, a touch screen, one or more biometric mechanisms, and the like. Output device 300 may include a device that outputs information to the operator, such as a display, a speaker, etc.

Communication interface 375 may include any transceiver-like mechanism that allows network device 300 to communicate with other devices and/or systems. For example, communication interface 375 may include mechanisms for communicating with components of system 100.

As will be described in detail below, network device 300 may perform certain functions in response to processor 355 executing software instructions contained in a computer-readable medium, such as memory 360. The software instructions may be read into memory 360 from another computer-readable medium or from another device via communication interface 375. The software instructions contained in memory 360 may cause processor 355 to perform processes that will be described later. Alternatively, hardwired circuitry may be used in place of or in combination with software instructions to implement processes consistent with embodiments described herein. Thus, systems and methods described herein are not limited to any specific combination of hardware circuitry and software.

Although FIG. 3 illustrates example components of network device 300, in some implementations, network device 300 may include fewer components, different components, differently arranged components, or additional components than those depicted in FIG. 3. Additionally, or alternatively, one or more components of network device 300 may perform one or more tasks described as being performed by one or more other components of network device 300.

Figure 4:
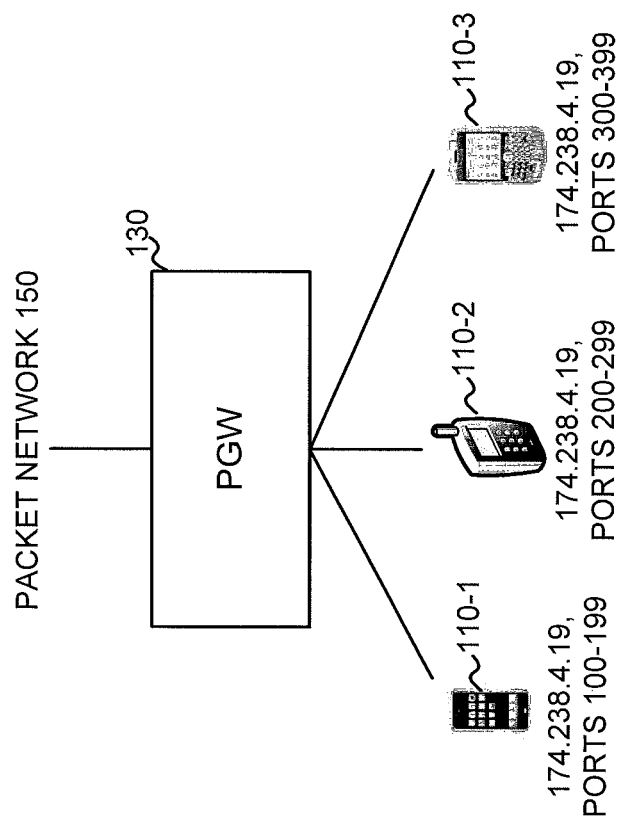
FIG. 4 is a diagram conceptually illustrating the use of NAT to assign IP addresses and port ranges to various client devices.

FIG. 4 is a diagram conceptually illustrating the use of NAT to assign IP addresses and port ranges to various client devices 110. In FIG. 4, assume that PGW 130 performs the NAT functions. Further, assume three client devices, 110-1, 110-2, and 110-3 have requested addresses as part of accessing a data network, such as packet network 150. PGW 130 may assign (also called "bind") IP addresses to client devices 110 from a pool of available IP addresses. Further, to increase the effective capacity of the pool, PGW 130 may assign multiple devices the same IP address but may specify a different port range for each client device 110. As particularly shown in FIG. 4, all of client devices 110-1 through 110-3 are assigned the IP address "174.238.4.19". Client device 110-1, however, is assigned a port range 100-199, client device 110-2 is assigned a port range 200-299, and client device 110-3 is assigned a port range 300-399. In this manner, all three client devices may be assigned the same IP address but may be assigned different, non-overlapping port ranges. Accordingly, when a response is received from packet network 150, addressed to a particular IP address, PGW 130 may be able to determine which of client devices 110 should receive the response based on the port associated with the response. In the system of FIG. 4, each client 110 may be required to limit the port used to the assigned port range.

PGW 130 may forward packets received from packet network 150, based on both the IP address and the port number associated with the packet. Thus, packets that are received by PGW 130 and that are destined for port 145 and IP address 174.238.4.19, may be forwarded to client device 110-1. However, packets that are received by PGW 130 and that are destined for port 260 and IP address 174.238.4.19, may be forwarded to client device 110-2.

Figure 5:
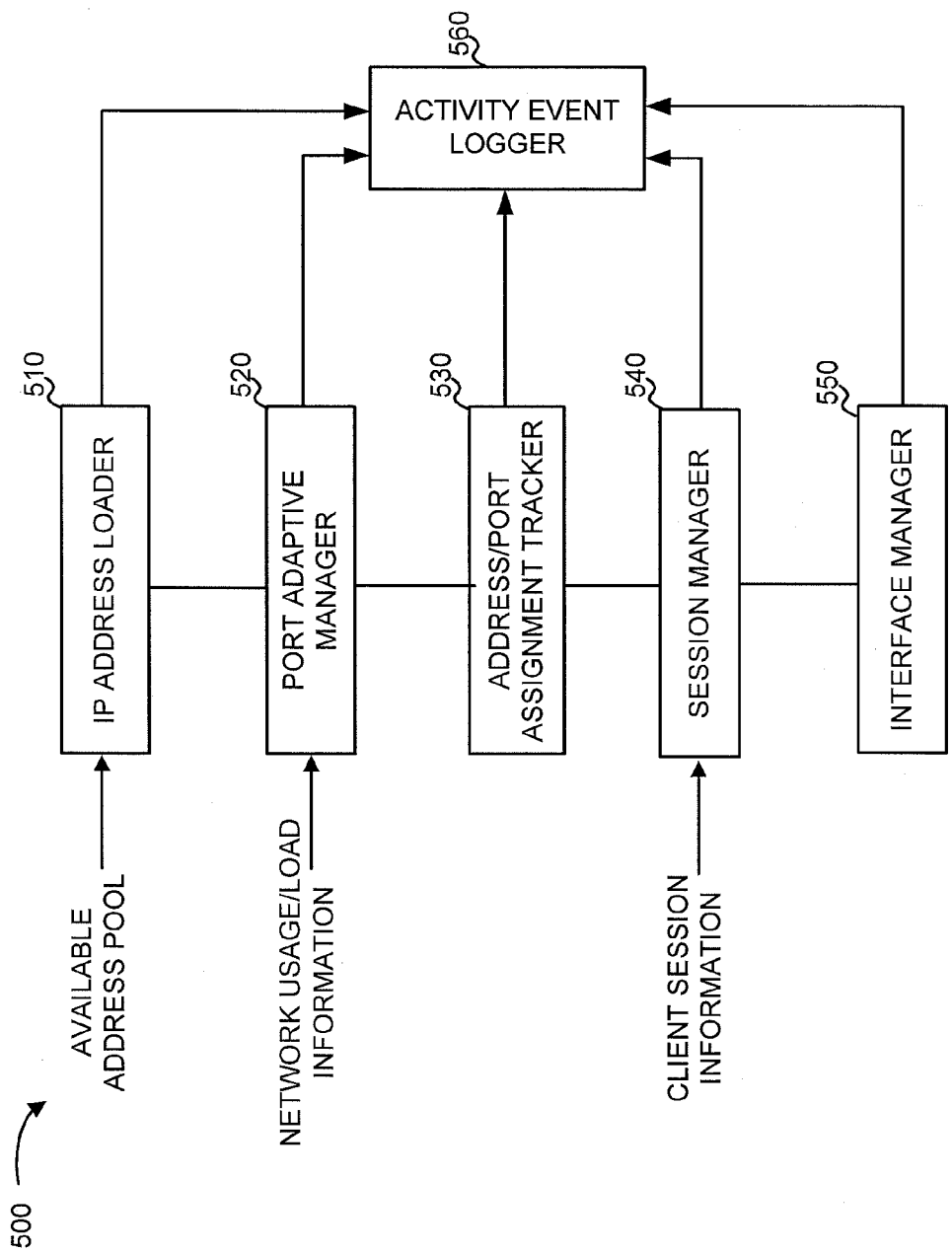
FIG. 5 is a diagram illustrating an example of functional components that may be used to adaptively perform NAT binding.

FIG. 5 is a diagram illustrating an example of functional components 500 that may be used to adaptively perform NAT binding. Functional components 500 may be implemented, for example, in PGW 130 or in a combination of PGW 130 and PCRF 140. Functional components 500 may include an IP address loader 510, a port adaptive manager 520, an address/port assignment tracker 530, a session manager 540, and an interface manager 550. Messages or other information, such as status information, associated with components 510 through 550 may be logged by an activity event logger 560.

IP address loader 510 may generally keep track of the IP addresses that are available to PGW 130 for assignment to client devices 110 or to other downstream network devices. IP address loader 510 may, for example, be initially configured with a set (pool) of IP addresses. The initial pool of IP addresses may be received, for example, from another network device in core wireless network 105, such as from PCRF 140. Alternatively, the initial pool of IP addresses may be received from an administrator or configured during deployment of PGW 130.

Port adaptive manager 520 may operate to adaptively configure the port blocks (i.e., the range of ports) that are assigned to client devices 110. In one implementation, the number of ports assigned to client device 110 may vary based on a historical measurement of network usage or load information. For example, the maximum number of simultaneously connected client devices 110, during an hour period, may be determined over a certain number of previous days. This maximum number may be used to determine the size of each port block to assign to each client device 110. For example, the total number of ports across all available IP addresses may be divided by the peak number of connecting client devices 110 to obtain the port block size.

Other techniques could alternatively or additionally be used by port adaptive manager 520 to configure the port block size used to assign to client devices 110. For example, port adaptive manager 520 may change the number of ports to assign to each device based on the expected change in the number of connected client devices 110 throughout the day. If, for instance, the peak connectivity time of client devices typically occurs in the evening hours, port adaptive manager 520 may lower the port block size during the evening and increase the port block size at other times.

Still other techniques could alternatively or additionally be used by port adaptive manager 520 to configure the port ranges that are assigned to client devices 110. For example, port adaptive manager 520 may monitor the number of non-allocated port blocks and reduce the assigned port block size when the number of non-allocated port blocks drops below a threshold.

Address/port assignment tracker 530 may keep track of the current state of each port block. Address/port assignment tracker 530 may maintain one or more tables or other data structures that keep track of the connected client devices 110 and the IP address and port range assigned to each connected client device 110. Additionally, address/port assignment tracker 530 may keep track of the address/port ranges that are unallocated and thus available for assignment to a connecting client device 110.

Session manager 540 may monitor the current session states of client devices 110. A client device 110, as part of connecting to packet network 150, may connect to PGW 130 to obtain an IP address/port block assignment that is valid for a single session. The session may end when, for example, client device 110 is turned off, is timed out by PGW 130, or when client device 110 or PGW 130 actively ends the session. In response to the termination of a session, session manager 540 and/or address/port assignment tracker 530 may release the IP address/port block for client device 110, thus freeing the IP address/port block to be used again with another client device 110.

Interface manager 550 may manage the interfaces between network devices and client devices 110. For example, interface manager 550 may manage the Gx interface with PCRF 140 to provide authentication, authorization, and accounting services relating to client device 110.

Activity event logger 560 may provide a logging facility for IP address loader 510, port adaptive manager 520, address/port assignment tracker 530, session manager 540, and interface manager 550. Events, messages, and other actions may be logged in activity event logger 560 for process flow control or debugging purposes.

Although FIG. 5 illustrates example functional components 500, in some implementations, functional components 500 may include fewer components, different components, differently arranged components, or additional components than those depicted in FIG. 5. Additionally, or alternatively, one or more of functional components 500 may perform one or more tasks described as being performed by one or more other components.

Figure 6:
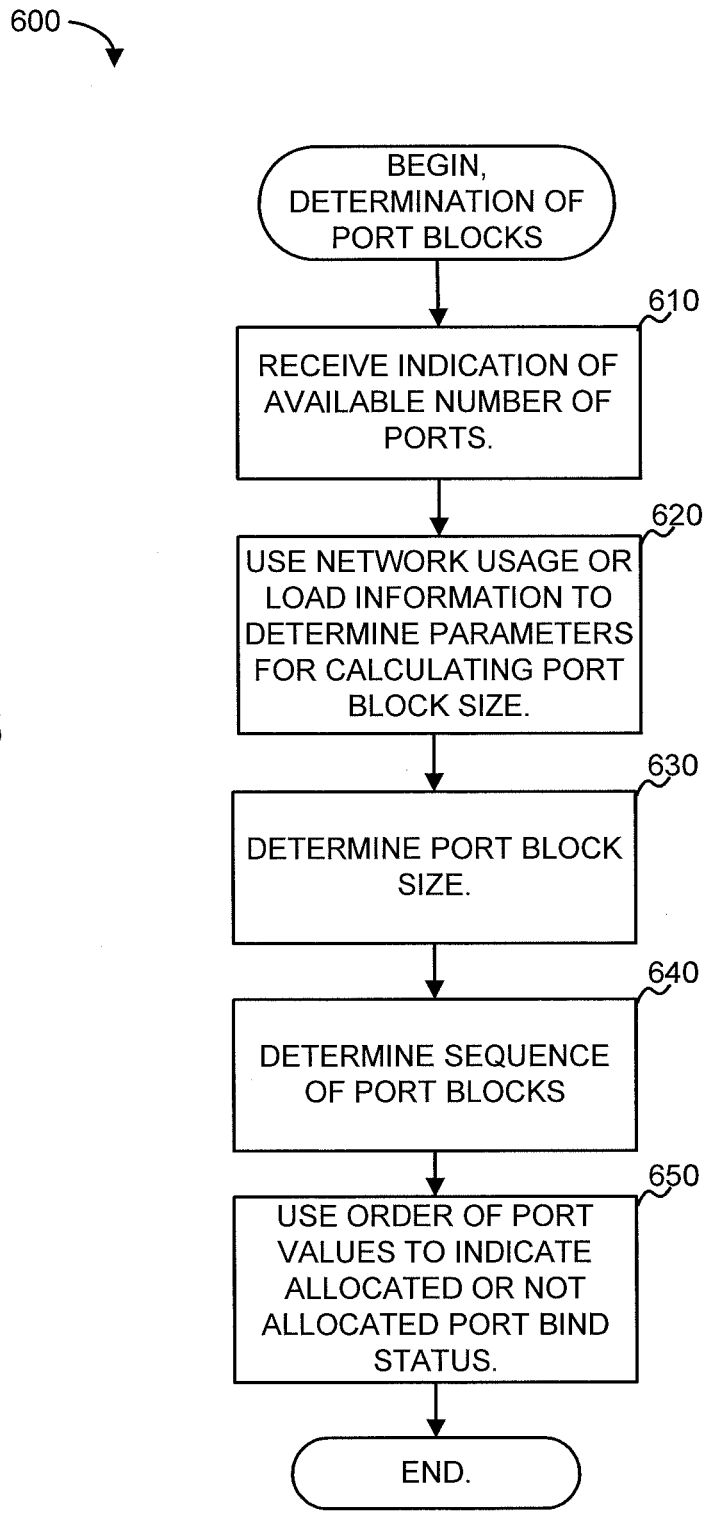
FIG. 6 is a flow chart of an example process for dynamically determining port block sizes to use based on network usage conditions.

FIG. 6 is a flow chart of an example process 600 for dynamically determining port block sizes to use based on network usage conditions. Process 600 may be performed by PGW 130, such as by functional components 500 of PGW 130. Alternatively, process 600 may be performed by other network devices in wireless core network 105.

Process 600 may be performed periodically by PGW 130, such as once daily or weekly. Alternatively, process 600 may be performed in response to changing network conditions, such as in response to an increase or decrease in the number of connected client devices 110.

Process 600 may include receiving an indication of the available number of ports (block 610). The available ports may be the ports that are to be divided for the purpose of assigning a subset of the available ports to each client device 110. The available number of ports may be specified, for example, as the number of ports per IP address in the IP address pool or as a total number of ports. For example, the available port range may include all ports that are normally available at a client device 110 (i.e., ports 0 through 65535). Alternatively, only a subset of the range of all possible ports may be used, such as the ports from 1000 through 65535. In either case, the total number of available ports per IP address, M, may be specified. The available ports may be received, for example, from another network device in core wireless network 105, such as from PCRF 140, from an administrator, or configured during deployment of PGW 130.

Process 600 may further include using network usage or load information to determine parameters that may be used in calculating the port block size to assign to each client (block 620). For example, the maximum number of client devices 110 that were connected at any one time over the last day may be determined. The value may be used in determining the port block size (i.e., number of ports) to assign to each client device 110.

Process 600 may further include determining the port block size (block 630). The port block size may be calculated based on the network usage information (e.g., as determined in block 620) and on the available number of ports (e.g., as determined in block 610). In one implementation, the total number of available ports (across all available IP addresses) may be divided by an estimate of the maximum number of connected client devices 110 during the busiest hour of the next day to obtain the port block size. The estimate of the maximum number of connected client devices 110 may be obtained by an analysis of historical network usage (e.g., over the previous week).

Based on the determined port block size, a sequence of potential port blocks may be determined (block 640). The sequence may, for example, relate an index value to the start and end ports for each port block. Assume, for example, that the port block size is determined to be P and a port block index is denoted as B, where B is an integer. The congruent list of port blocks may then be created using the equation:

$$Y+B*P, \quad\quad\quad (eq. 1)$$

where Y represents an initial offset (i.e., a starting port number).

FIG. 7 is a diagram illustrating an example sequence of starting port numbers and ending port numbers generated using block 640. In FIG. 7, assume that Y is equal to 1000 and that P is equal to 100. Based on these values, table 700 may be generated. As shown, table 700 includes index (B) field 710, start port range field 720, and end port range field 730. Additionally, for each entry in table 700, status field 740 may indicate the current status of the port range. Table 700 may represent available port ranges for a single IP address. In one implementation, separate instances of table 700 may be implemented for each IP address in the IP address pool.

In the example shown in FIG. 7, the first entry corresponds to index value 0 (field 710), which has a starting port range value of 1000 (field 720) and an ending port range value of 1099 (field 730). The current status of the first entry is indicated as allocated, which may mean that the indicated port block is assigned to a client device 110. The other entries shown in table 700, however, are illustrated as including the status value "not allocated," indicating that these port blocks may be available to be assigned to a connecting client device.

In one implementation, referring back to FIG. 6, the order in which the port values are listed may be used to indicate an active bind allocation status of that port range (block 650). For example, the port block corresponding to indexing zero in table 700 may be stored as 1000:1099 (ascending order) to indicate that the port block is allocated, the port range may be stored as 1099:1000 (descending order) to indicate that the port range is not allocated.

FIG. 8 is a diagram of a table 800 illustrating an example sequence of starting port numbers and ending port numbers, generated using block 630, and stored in a manner in which the sequence of the starting and ending ports are used to indicate whether the port block is allocated or not allocated (i.e., bound to a particular client device). In FIG. 8, table 800 is illustrated as being similar to table 700. However, in table 800, status field 740 is not implemented. Instead, the ordering of the start port range and end port range are used to indicate whether the port block is allocated or not allocated. In this example, in row 0, the start port value and end port values are in ascending order, which may indicate that the port block is allocated. In rows 1 to 4, however, the start port value and end port value are in descending order, which may indicate that these port blocks are not allocated. In an alternative implementation, an ascending port range value may be used to indicate a non-allocated port and descending port range value may be used to indicate an allocated port.

Figure 9:
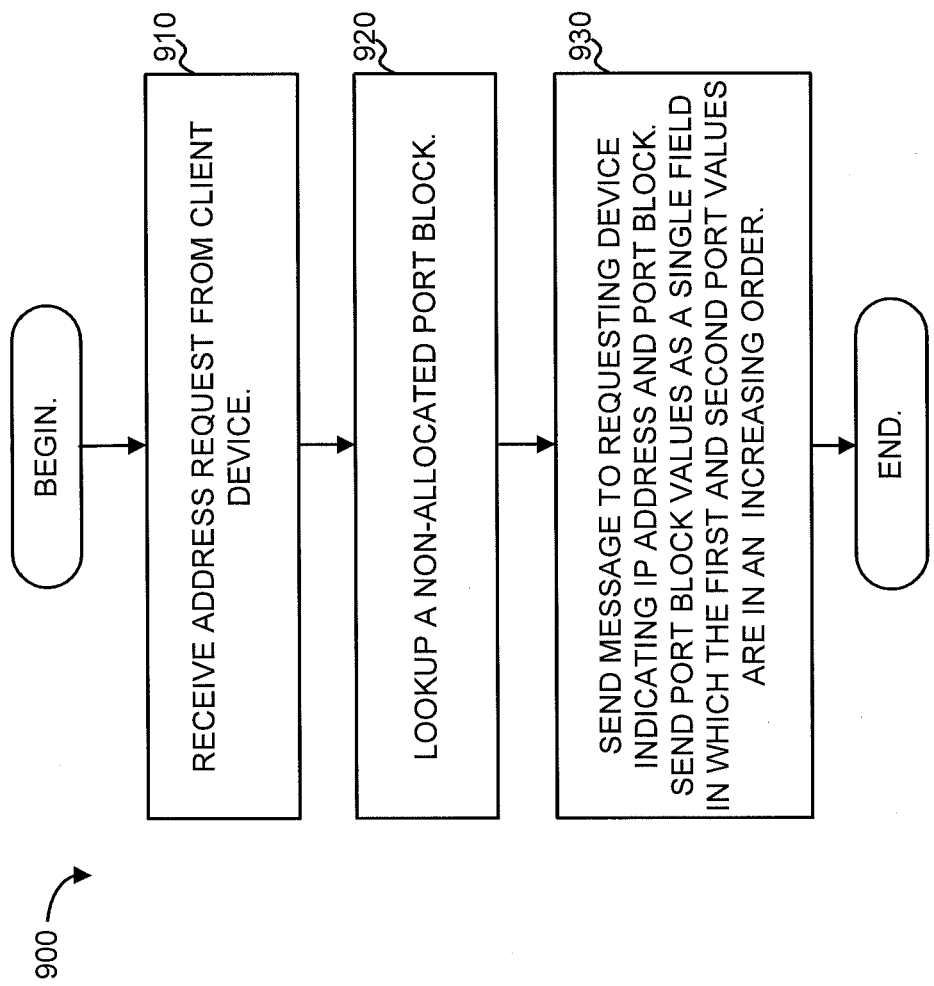
FIG. 9 is a flow chart of an example process for allocating IP addresses and port blocks.

FIG. 9 is a flow chart of an example process 900 for allocating IP addresses and port blocks to devices such as client devices 110. Process 900 may be performed, for example, by PGW 130. The IP addresses and port blocks may be allocated to client devices 110, or in some situations, other downstream network devices, such as routers.

Process 900 may include receiving a request from a client device 110 (block 910). Client devices 110, when accessing packet network 150, may first obtain an address to use in communicating with packet network 150. Client device 110 may thus send a request to PGW 130 for an IP address and port block.

In response to the request from client device 110, process 900 may further include looking up a non-allocated port block (block 920). The non-allocated port block may be looked-up, for example, from table 700 or table 800, which may be maintained by address/port assignment tracker 530.

Process 900 may further include sending a message to the client device, where the message indicates the IP address and port block that is to be bound to the device (block 930). In one implementation, the message may be implemented in a header field of a packet sent to the client device. The port block values may be specified as a single field in which the upper and lower port values are ordered in increasing order (block 930). For a port block covering the range port 1000 to port 1099, inclusive, the single field may be expressed as "1000:1099". The ascending order of the port ranges may indicate that the included port block should be interpreted as an allocation.

By using the order of the port values in a message to indicate whether the message is an allocation or release of the port block, a separate field indicating allocation or release does not need to be included in the message. Advantageously, in contrast to techniques that explicitly include a field controlling whether a message is an allocation or release message, byte size overhead in the control information, such as in the IP header, may be reduced. Accordingly, more bandwidth may be available to the payload to transport real data traffic. Further, by using a single field, the processing cost to parse and process the additional field attributes may be decreased, potentially improving system performance.

FIG. 10A is a diagram illustrating example header fields 1000 for allocating an IP address and port block. Header fields 1000 may be, for example, header fields in a packet. Although labels are illustrated in FIG. 10A for ease of explanation, the illustrated labels may not be used in practice. Instead, the fields shown in FIG. 10A may be consecutive, predetermined length fields that are part of the header.

As shown in FIG. 10A, header fields 1000 may include an IP address field 1010 and a NAT port block range field 1020. Other fields, such as, for example, fields for a "loading factor," "binding-timer," "correlation-ID," and "framed IP address" are also shown in FIG. 10A but will not be described in additional detail herein.

IP address field 1010 may include the IP address that is being allocated. In the example of FIG. 10A, the IP address is the IPv4 address "174.238.4.19." NAT port block range field 1020 may indicate a first and second value for a range of port blocks. As previously mentioned, if the first and second values are in ascending order, as shown in FIG. 10A, this may indicate that the packet is allocating the IP address and port range. In FIG. 10A, for example, the first and second values are separated using a colon, so that the port range is specified as ports one to 20. Because the first port value is less than the second, the receiving device should interpret the packet as an allocation of the IP address and port range to the device.

Figure 11:
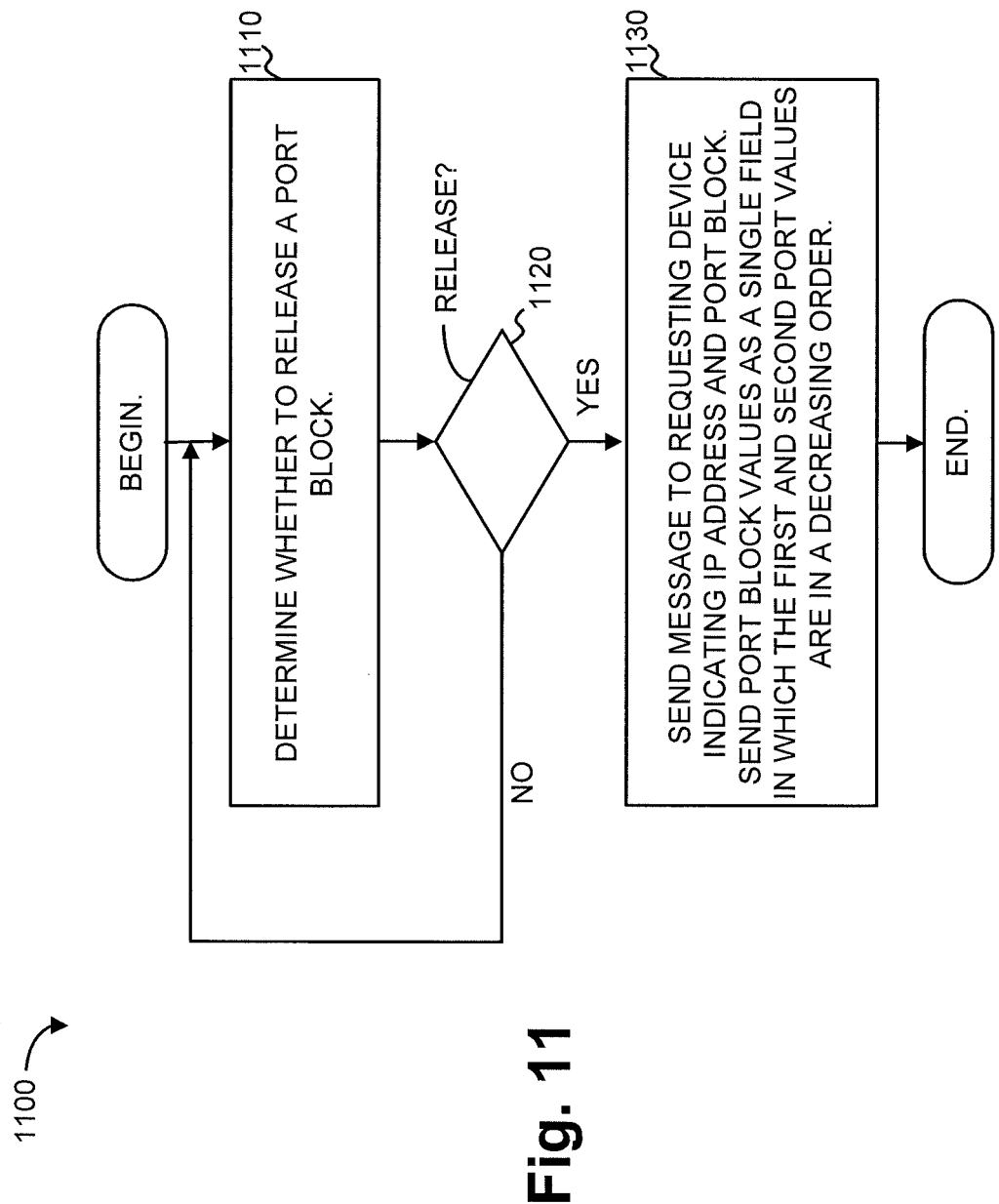
FIG. 11 is a flow chart of an example process for releasing IP addresses and port blocks.

FIG. 11 is a flow chart of an example process 1100 for releasing IP addresses and port blocks. Process 1100 may be performed, for example, by PGW 130.

Process 1100 may include determining whether to release a port block, (block 1110), such as a port block assigned to a particular client device. A port block may be released for a number of possible reasons, such as due to a client device 110 actively disconnecting its connection to packet network 150, a timeout of a client device 110 (e.g., no communication with client device 110 for a certain time period), or PGW 130 determining to unilaterally disconnect client device 110.

When a determination is made to release the port block for the client device, (block 1120, YES), process 1100 may further include sending a message to the client device, where the message indicates the IP address and port block that is being released (block 1130). In one implementation, the message may be implemented in a header field of a packet sent to the client device. The port block values may be sent as a single field in which the upper and lower port values are entered in decreasing order. For a port block covering the range port 1000 port 1099 inclusive, the single field may be expressed as "1099:1000". The descending order of the port ranges may indicate that the included port block should be interpreted as a release of the port block.

FIG. 10B is a diagram illustrating example header fields 1030 for releasing an IP address and port block. Header fields 1030 may be, for example, header fields in a packet. Although labels are illustrated in FIG. 10B for ease of explanation, the illustrated labels may not be used in practice. Instead, the fields shown in FIG. 10B may be consecutive, predetermined length fields that are part of the header.

As shown in FIG. 10B, header fields 1030 may include an IP address field 1040 and a NAT port block range field 1050. Other fields, such as, for example, fields for a "loading factor," "binding-timer," "correlation-ID," and "framed IP address" are also shown in FIG. 10B but will not be described in additional detail herein.

IP address field 1040 may include the IP address that is being released. In the example of FIG. 10B, the IP address is the IPv4 address "174.238.4.19." NAT port block range field 1050 may indicate a first and second value for a range of port blocks. As previously mentioned, if the first and second values are in descending order, as shown in FIG. 10B, this may indicate that the packet is releasing the IP address and port range. In FIG. 10B, for example, the first and second values are separated using a colon, so that the port range is specified as ports 20 to one. Because the first port value is greater than the second, the receiving device should interpret the packet as releasing the IP address and port range.

Figure 12:
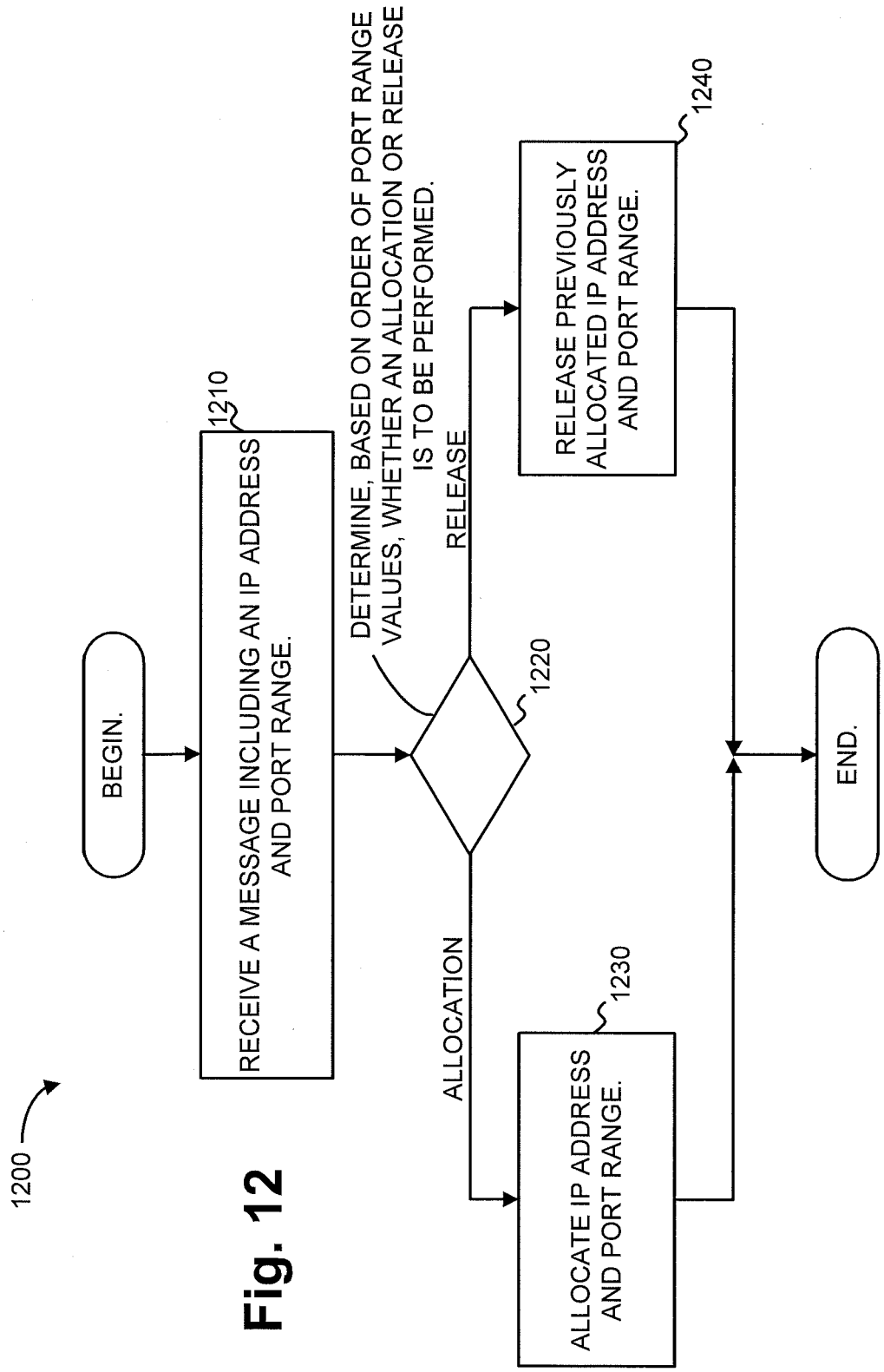
FIG. 12 is a flow chart of an example process performed in response to reception of a message.

FIG. 12 is a flow chart of an example process 1200 performed in response to reception of a message. Process 1200 may be performed, for example, by client device 110.

Process 1200 may include receiving a message that includes an IP address and port range (block 1210). The message may be, for example, an IP packet that includes a header, in which fields of the header include an IP address field and a port block field that includes a first port value and a second port value.

Process 1200 may further include determining whether the message received in block 1210 indicates an allocation or a release of the IP address and port block based on the order of the first and second port values (block 1220). For example, and as previously discussed, the first port value being less than the second port value may indicate an allocation operation and the first port value being greater than the second port value may indicate a release operation.

When the result of block 1220 is an allocation operation (block 1220-ALLOCATION), client device 110 may bind the received IP address and port range (block 1230). When, however, the result of blocks 1220 is a release operation (block 1220-RELEASE), client device 110 may release the received IP address and port range (blocks 1240).

While a series of blocks has been described with regard to FIGS. 6, 9, 11, and 12, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions.

A component, as used herein, may include hardware, such as a processor, ASIC, or FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device-implemented method, comprising:
    determining, by the network device and for at least one specified time period, a value based on network usage conditions;
    determining, by the network device and based on the determined value, a port block size indicating a quantity of ports to allocate to client devices,
    wherein determining the port block size comprises:
        determining the quantity of ports to allocate to each of the client devices based on a total available number of ports and based on a maximum number of client devices that have historically been simultaneously allocated an IP address and a port range;
    receiving, by the network device and from one of the client devices, a request for an address; and
    transmitting, by the network device and in response o the request, a message including an Internet Protocol (IP) address and a port range, the message indicating that the IP address and port range is to be allocated to the one of the client devices based on an order of a first port value and a second port value in the port range, where the port range covers a quantity of ports corresponding to the port block size.

2. The method of claim 1, where the network device performs a network address translation (NAT) function for the client devices.

3. The method of claim 1, where the message includes a packet in which the IP address and port range are communicated in a header of the packet.

4. The method of claim 1, where, when the order of the first port value and the second port value are in an ascending order, the message indicates allocation of the IP address and port range and when the order of the first port value and the second port value are in a descending order, the message indicates release of the IP address and port range.

5. The method of claim 1, where the port range is included in a single field of the message.

6. The method of claim 1, further comprising:
    transmitting a second message including the IP address and the port range, the second message indicating that the IP address and the port range are to be released by the one of the client devices when the first port value and the second port value are in a descending order.

7. The method of claim 1, where the client devices include portable wireless devices that connect to a wireless network that includes a long term evolution (LTE) based network or a 3rd Generation Partnership Project (3GPP or 3G) based network.

8. The method of claim 7, where the network device includes a packet data network gateway for the wireless network.

9. The network device of claim 1, further comprising:
    adaptively modifying the port block size to respond to changes in the network usage conditions over a plurality of specified time periods.

10. A non-transitory computer-readable medium that stores programming instructions for execution by one or more processors, the non-transitory computer-readable medium comprising:
    one or more instructions to determine a value that indicates network usage conditions over at least one specified period;
    one or more instructions to determine, based on the value, a port block size indicating a quantity of ports to allocate to client devices,
    wherein the one or more instructions to determine the port block size is further based on a total available number of ports and based on a maximum number of client devices that have been simultaneously allocated an IP address and a port range;
    one or more instructions to generate, in response to a request from one of the client devices for assignment of an Internet Protocol (IP) address to access a packet data network, a range of port values corresponding to the determined port block size; and
    one or more instructions to transmit, in response to the request, a packet instructing allocation of a first IP address and the range of port values, where the range of port values is specified as a first port value and a second port value and where the packet indicates allocation of the first IP address and the range of port values based on an order of the first port value and the second port value.

11. The non-transitory computer-readable medium of claim 10, wherein the network device performs a network address translation (NAT) function for the client devices.

12. The non-transitory computer-readable medium of claim 10, wherein the first port value and the second port value are included in a single field of the packet.

13. The non-transitory computer-readable medium of claim 10 further comprising:
    one or more instructions to transmit a second packet including the first IP address and the range of port values, the second packet indicating that the IP address and the range of port values are to be released by the one of the client devices when the first port value and the second port value are in a descending order.

14. The non-transitory computer-readable medium of claim 10 further comprising:
    one or more instructions to adaptively modify the port block size to respond to changes in the network usage conditions over another specified period.

15. A gateway device comprising:
    an Internet Protocol (IP) address loader to keep track of a pool of IP addresses that are available to be assigned to connecting client devices;
    a port adaptive manager to adaptively configure, based on network usage conditions for at least one specified period, a port block size indicating a number of ports to allocate to client devices when assigning one of the IP addresses from the pool of IP addresses to a particular one of the client devices;

a port assignment tracker to keep track of a current allocation state of each of a plurality of port blocks, wherein each of the plurality of port blocks is defined by a port range,
wherein the port block size is determined based on a total number of available ports and based on a maximum number of client devices that have historically been simultaneously allocated an IP address and a port block; and
a transmitter to transmit the allocation state of the plurality of port blocks to other devices via a message that includes a first port value and a second port value for the port range, wherein an order of the first port and the second port value in the message indicates whether the message is for allocation or release of the corresponding port block.

16. The gateway device of claim 15, where the first port value and the second port value are included in a single field of the message.

17. A wireless communication device comprising:
a processor;
a non-transitory computer readable medium including programming instructions, that when executed by the processor, cause the processor to:
receive a packet transmitted to the wireless communication device, the packet including a header that contains an Internet Protocol (IP) address and a port range, defined as first and second port range values, relevant to the wireless communication device, and
wherein the port range identifies a number of ports assigned to the wireless communication devices based on historical measurements of network usage of a number of subscribers that are connected during a peak period of network use;
interpret the IP address and port range as an allocation of the IP address and port range to the wireless communication device when an order of the first and second port range values are in a predetermined one of ascending or descending order;
interpret the IP address and port range as a release of the address and port range to the wireless communication device when the order of first and second port range values are in an opposite ordering of the predetermined order corresponding to the allocation; and
assign or release the IP address and port range based on the order of the first and second port range values.

18. The wireless communication device of claim 17, where the first and second port range values are specified as a single field in the packet.

19. The wireless communication device of claim 17, where the wireless communication device communicates through a tong term evolution (LTE) based wireless network or a 3rd Generation Partnership Project (3GPP or 3G) based wireless network.

* * * * *